(12) United States Patent
Lin (10) Patent No.: US 11,489,615 B2
(45) Date of Patent: Nov. 1, 2022

(54) METHOD AND DEVICE FOR TRANSMITTING AND RECEIVING CONFIGURATION INFORMATION

(71) Applicant: GUANGDONG OPPO MOBILE TELECOMMUNICATIONS CORP., LTD., Guangdong (CN)

(72) Inventor: Yanan Lin, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 8 days.

(21) Appl. No.: 16/733,085

(22) Filed: Jan. 2, 2020

(65) Prior Publication Data
US 2020/0136749 A1 Apr. 30, 2020

Related U.S. Application Data

(63) Continuation of application No. PCT/CN2018/081647, filed on Apr. 2, 2018.

(51) Int. Cl.
*H04L 1/00* (2006.01)
*H04L 1/20* (2006.01)
(Continued)

(52) U.S. Cl.
CPC .......... *H04L 1/0003* (2013.01); *H04L 1/0026* (2013.01); *H04L 1/203* (2013.01); *H04L 5/0057* (2013.01); *H04W 72/042* (2013.01)

(58) Field of Classification Search
None
See application file for complete search history.

(56) References Cited

U.S. PATENT DOCUMENTS

| 9,667,362 B2 | 5/2017 | Ihm |
| 2016/0262147 A1 | 9/2016 | Wei et al. |

(Continued)

FOREIGN PATENT DOCUMENTS

| CN | 101594639 A | 12/2009 | |
| CN | 101594639 A | 12/2009 | ............ H04W 28/06 |

(Continued)

OTHER PUBLICATIONS

The EESR of corresponding European application No. 18913418.2, dated Jul. 2, 2020.

(Continued)

*Primary Examiner* — Saad Khawar
(74) *Attorney, Agent, or Firm* — Ladas & Parry LLP (57) ABSTRACT

There is provided a method and a device for transmitting and receiving configuration information. The method includes: determining, by a network device, configuration information, where the configuration information is configured to indicate, for a terminal device, a first CQI value range under a first target BLER; and transmitting, by the network device, the configuration information to the terminal device. In the embodiments of the present disclosure, the network device indicates the first CQI value range under the first BLER to the terminal device by using the configuration information, which can effectively save the overhead of high-level signaling, compared to by a manner of configuring a CQI table. In addition, since the CQI value range is configurable, not only the reliability of the CQI feedback but also efficiency of the CQI indication is improved.

20 Claims, 3 Drawing Sheets

(51) Int. Cl.
*H04L 5/00* (2006.01)
*H04W 72/04* (2009.01)

(56) References Cited

U.S. PATENT DOCUMENTS

| | | | | |
|---|---|---|---|---|
| 2018/0007704 | A1 | 1/2018 | Leicht et al. | |
| 2020/0119836 | A1* | 4/2020 | Lyu | H04L 1/0073 |
| 2020/0169902 | A1* | 5/2020 | Yasukawa | H04W 24/10 |
| 2020/0366406 | A1* | 11/2020 | Kim | H04L 1/203 |
| 2020/0412431 | A1* | 12/2020 | Park | H04B 7/0626 |

FOREIGN PATENT DOCUMENTS

| | | | |
|---|---|---|---|
| CN | 101621359 A | 1/2010 | |
| CN | 101621359 A | 1/2010 | H04L 1/06 |
| CN | 102438312 A | 5/2012 | H04W 72/04 |
| CN | 102438312 A | 5/2012 | |
| CN | 102484774 A | 5/2012 | |
| CN | 103037520 A | 4/2013 | H04W 72/04 |
| CN | 103037520 A | 4/2013 | |
| CN | 103378896 A | 10/2013 | H04B 7/06 |
| CN | 103378896 A | 10/2013 | |
| CN | 103503352 A | 1/2014 | |
| CN | 103580788 A | 2/2014 | |
| CN | 105991233 A | 10/2016 | |
| CN | 105991233 A | 10/2016 | H04L 1/00 |
| CN | 105991235 A | 10/2016 | |
| CN | 106211337 A | 12/2016 | |
| CN | 106211337 A | 12/2016 | H04W 72/04 |
| CN | 106549726 A | 3/2017 | |
| CN | 106559171 A | 4/2017 | |
| CN | 106559171 A | 4/2017 | H04L 1/00 |
| CN | 106888068 A | 6/2017 | |
| CN | 107800514 A | 3/2018 | H04L 1/00 |
| CN | 107800514 A | 3/2018 | |
| CN | 107819549 A | 3/2018 | H04L 1/00 |
| CN | 107819549 A | 3/2018 | |
| EP | 2879427 A1 | 6/2015 | |
| EP | 3355502 A1 | 8/2018 | |
| EP | 3439355 A1 | 2/2019 | |
| WO | 2017050273 A1 | 3/2017 | |
| WO | 2017169829 A1 | 10/2017 | |
| WO | WO2017169829X | 2/2019 | H04W 24/10 |

OTHER PUBLICATIONS

Mediatek Inc:"CQI reporting for muitiple services in NR", 3GPP Draft; R1-1801672_CQI Reporting for Multiple Services in NR, 3rd Generation Partnership Project (3GPP), Mobile Competence Centre; 650, Route Des Lucioles; F-06921 Sophia-Antipolis Cedex; Franc, vol. RAN WG1, No. Athens, Greece; Feb. 26-Mar. 2, 2018 Feb. 17, 2018(Feb. 17, 2018), XP061397673.

International Search Report (ISR) with an English translation dated Dec. 27, 2018 for Application No. PCT/CN2018/081647.

A Chinese Office Action dated Dec. 10, 2019 for Application No. CN 201880003177.3.

A Notice of Allowance dated Mar. 2, 2020 for Application No. 201880003177.3, and references cited therein.

The first Office Action of corresponding European application No. 18913418.2, dated Apr. 23, 2021.

The second Office Action of corresponding European application No. 18913418.2, dated Oct. 21, 2021.

The first Office Action of corresponding Chinese application No. 202010399349.2, dated Apr. 1, 2022.

The third Office Action of corresponding European application No. 18913418.2, dated Apr. 19, 2022.

Mediatek Inc: MCS and CQI Tables design for URLLC, 3GPP Draft; E1-1801676, XP051397677.

Office Action of corresponding Chinese application No. 202010399349. 2, dated Jul. 12, 2022, with machine translation provided by Global Dossier.

ZTE, Sanechips, Considerations on CQI/MCS table(s) and related aspects for URLLC, R1-1801631, 3GPP TSG RAN WG1 Meeting #92, Athens, Greece, Feb. 26-Mar. 2, 2018.

* cited by examiner

METHOD AND DEVICE FOR TRANSMITTING AND RECEIVING CONFIGURATION INFORMATION

CROSS-REFERENCE TO RELATED APPLICATIONS

The patent application is a continuation of International Application No. PCT/CN2018/081647, filed on Apr. 2, 2018, entitled "METHOD AND DEVICE FOR TRANSMITTING AND RECEIVING CONFIGURATION INFORMATION", the content of which is hereby incorporated by reference herein in its entirety.

TECHNICAL FIELD

Embodiments of the present disclosure relate to the field of communications, and more particularly, to a method and a device for transmitting and receiving configuration information.

BACKGROUND

The New Radio (NR) system of the 5-Generation (5G) mobile communication technology introduces the Ultra-Reliable and Low Latency Communication (URLLC) service, which features in achieving ultra-reliability (e.g., 99.999%) transmission within an extreme latency (e.g., 1 ms). In order to achieve this goal, a technical scheme to feedback channel quality indicator (CQI) under a lower target block error rate (BLER) is proposed, and a lower modulation and coding scheme (MCS) may also be adopted for corresponding data transmission. However, in the prior art, there is no specific solution for a CQI table design configuring the two target BLERs.

SUMMARY

There is provided a method and a device for transmitting and receiving configuration information that may enable the terminal device to feedback CQI to a network device for different BLERs.

In a first aspect, there is provided a method for transmitting configuration information, including:
determining, by a network device, configuration information, where the configuration information is configured to indicate, for a terminal device, a first CQI value range under a first target BLER; and
transmitting, by the network device, the configuration information to the terminal device.

In the embodiments of the present disclosure, the network device indicates the first CQI value range under the first BLER to the terminal device by using the configuration information, which can effectively save the overhead of high-level signaling, compared to by a mode of configuring a CQI table. In addition, since the CQI value range is configurable, firstly, the network device can configure a continuous CQI value range for the terminal device according to continuous changes of a user channel quality, so that the configured CQI value range can greatly conform to changes of the user channel, thereby improving the reliability of the CQI feedback; further, the network device can also adjust the length of the value range according to an application scenario, resulting in reduced number of bits of CQI feedback from the terminal device, thereby avoiding resource waste and further improving the reliability of the CQI feedback. In addition, in embodiments of the present disclosure, different CQI value ranges can be configured for different target BLERs, so that the configured CQI value range matches the user channel environment and the transmission requirement, so as to improve the CQI indicating efficiency and reliability.

In some possible implementations, the first CQI value range includes some or all of CQI indexes in a CQI table except a first CQI index, where the first CQI index is configured to reflect that a modulation and coding mode required by the terminal device to achieve the first target BLER is not within a range of the CQI table, or the first CQI value range includes some or all of the CQI indexes in the CQI table.

In some possible implementations, the configuration information includes:
first indication information, configured to indicate a position in the CQI table at which a start position of the first CQI value range locates.

In some possible implementations, a length of the first CQI value range in the CQI table is pre-configured.

In some possible implementations, the configuration information includes:
second indication information, configured to indicate a length of the first CQI value range in the CQI table.

In some possible implementations, positions in the CQI table at which starting positions of CQI value ranges under different target BLERs locate are different.

In some possible implementations, lengths of CQI value ranges under different target BLERs in the CQI table are the same, or are different.

In some possible implementations, the configuration information is further configured to indicate, for the terminal device, a first MCS value range corresponding to a first type of multiple types.

In some possible implementations, the multiple types are distinguished by at least one of a DCI format, a search space and a target BLER.

In some possible implementations, the first MCS value range includes some or all of MCS indexes in an MCS table.

In some possible implementations, the configuration information includes:
third indication information, configured to indicate a position in the MCS table at which a starting position of the first MCS value range locates.

In some possible implementations, a length of the first MCS value range in the MCS table is pre-configured.

In some possible implementations, the configuration information further includes:
fourth indication information, configured to indicate a length of the first MCS value range in the MCS table.

In some possible implementations, positions in the MCS table at which starting positions of MCS value ranges corresponding to different types locate are different.

In some possible implementations, lengths of MCS value ranges corresponding to different types in the MCS table are the same, or are different.

In a second aspect, there is provided a method for receiving configuration information, including:
receiving, by a terminal device, configuration information transmitted by a network device, where the configuration information is configured to indicate, for the terminal device, a first CQI value range under a first target BLER;
determining, by the terminal device, a second CQI value range according to the configuration information; and
selecting, by the terminal device, a CQI index from the second CQI value range, and reporting the CQI index to the network device.

In some possible implementations, the first CQI value range includes some or all of CQI indexes in a CQI table except a first CQI index, where the first CQI index is configured to reflect that a modulation and coding mode required by the terminal device to achieve a first target BLER is not within a range of the CQI table, or the first CQI value range includes some or all of the CQI indexes in the CQI table; and where the determining, by the terminal device, the second CQI value range according to the configuration information, including:

determining, by the terminal device, a range formed by the first CQI value range and the first CQI index to be the second CQI value range.

In a third aspect, there is provided a network device, including:

a determining unit, configured to determine configuration information, where the configuration information is configured to indicate, for the terminal device, a first CQI value range under a first target BLER; and a transmitting unit, configured to transmit the configuration information to the terminal device.

In a fourth aspect, there is provided a terminal device, including:

a receiving unit, configured to receive configuration information transmitted by a network device, where the configuration information is configured to indicate, for the terminal device, a first CQI value range under a first target BLER; and a processing unit, configured to determine the second CQI value range according to the configuration information, and select a CQI index from the second CQI value range and report the CQI index to the network device.

In a fifth aspect, there is provided a network device, including:

a processor, configured to determine configuration information, where the configuration information is configured to indicate, for a terminal device, a first CQI value range under a first target BLER; and a transmitter, configured to transmit the configuration information to the terminal device.

In a sixth aspect, there is provided a terminal device, including:

a receiver, configured to receive configuration information transmitted by a network device, where the configuration information is configured to indicate, for the terminal device, a first CQI value range under a first target BLER; and a processor, configured to determine the second CQI value range according to the configuration information, and select a CQI index from the second CQI value range and report the CQI index to the network device.

In a seventh aspect, there is provided a computer readable medium for storing a computer program including instructions for performing the method embodiments of the first aspect or of the second aspect described above.

In an eighth aspect, there is provided a computer chip, including: an input interface, an output interface, at least one processor, and a memory, the processor is configured to execute codes in the memory, and when the codes is executed, the processor may perform the processes performed by the network device in the method for transmitting configuration information in the first aspect and in various implementations thereof as described above.

In a ninth aspect, there is provided a computer chip, including: an input interface, an output interface, at least one processor, and a memory, the processor is configured to execute codes in the memory, and when the code is executed, the processor may perform the processes performed by the terminal device in the method for receiving configuration information in the second aspect and in the implementations thereof as described above.

In a tenth aspect, there is provided a communication system including the network device and the terminal device described above.

DESCRIPTION OF EMBODIMENTS

Figure 1:
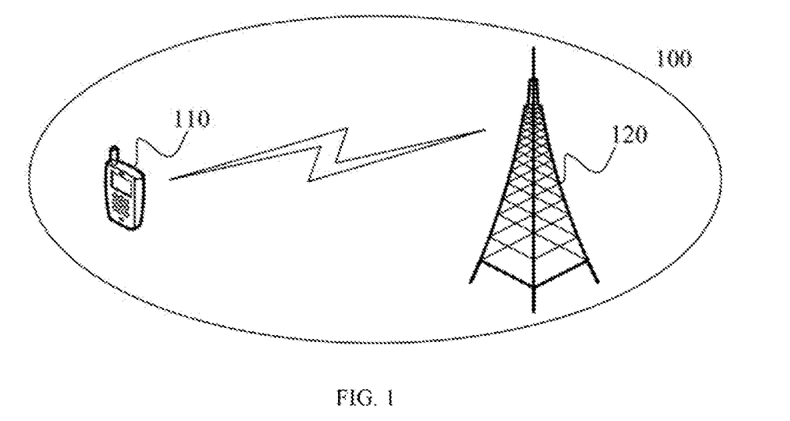
FIG. 1 is an example of an application scenario of the present disclosure.

FIG. 1 is a schematic diagram of an application scenario in 5G according to an embodiment of the present disclosure.

As shown in FIG. 1, a communication system 100 may include a terminal device 110 and a network device 120. The network device 120 may communicate with the terminal device 110 via an air interface. Multi-service transmission is supported between the terminal device 110 and the network device 120.

It should be understood that embodiments of the present disclosure are only illustrated by taking the 5G communication system 100 as an example, but are not limited thereto. That is to say, the technical solution of the embodiments of the present disclosure may be applied to various scenarios including the 5G communication system, for example, a hybrid deployment scenario composed of the 5G communication system and a first communication system, and the like. The first communication system may be any communication system, for example: a Long Term Evolution (LTE) system, a LTE Time Division Duplex (TDD), a Universal Mobile Telecommunication System (UMTS), and the like.

Moreover, the present disclosure describes various embodiments with reference to the network device and the terminal device.

The network device 120 may refer to any entity for transmitting or receiving signals on the network side, for example, a base station device in the 5G network or the like.

The terminal device 110 may be any terminal device. Specifically, the terminal device 110 can communicate with one or more core networks via a radio access network (RAN), and may also be referred to as an access terminal, a user equipment (UE), a subscriber unit, a subscriber station, a mobile station, a station, a remote station, a remote terminal, a mobile device, a user terminal, a terminal, a wireless communication device, a user agent or a user apparatus. For example, it may be a cellular phone, a cordless phone, a session initiation protocol (SIP) phone, a wireless local loop (WLL) station, a personal digital assistant (PDA), a handheld device with wireless communication capability, a computing device or other processing devices connected to a wireless modem, a vehicle-mounted device, a wearable device, and etc.

In a wireless network, one device (such as a network device) transmits data to another device (such as a terminal device) in a block. The transmitting end calculates a cyclic redundancy check (CRC) using the data in the block and transmits the CRC to the receiving end along with the block. The receiving end may calculate one CRC according to the received data, and compare the CRC with the received CRC. If the two CRCs are equal, it may be considered that the receiving end received correct data successfully, and reply an acknowledgement (ACK) to the transmitting end; and if the two CRCs are not equal, it may be considered that the receiving end received wrong data and reply a non-acknowledgement (NACK) to the transmitting end, so as to request the transmitting end to retransmit the block to the receiving end. During a specific time period, if the transmitting end has not received a reply from the receiver yet, the transmitting end assumes that the previously transmitted block does not reach the receiver, and the transmitting end automatically retransmits the block. In the aforementioned description, a BLER may be understood as a percentage of error blocks to all transmitted blocks (only the blocks initially transmitted are calculated), and a target BLER may be understood as that a percentage of error blocks to all transmitted blocks is ensured to be within a certain value. For example, in practical applications, as an example, the target BLER of a control channel may be 1%, and the target BLER of a data channel may be 10%.

It should be understood that, in the embodiments of the present disclosure, the ACK/NACK for the retransmitted blocks may not be calculated during the BLER calculation. That is to say, the BLER is 10% without retransmission of the hybrid automatic repeat request (HARQ), and the BLER is about 1% with retransmission of the HARQ, and the performance may be increased to 10^-5 further with ARQ of radio link layer control (RLC) protocol layer. For example, assuming that 500 blocks of data are transmitted, 499 blocks is replied with ACK and 1 block is replied with NACK, and the BLER is 1/500=0.002*100%=0.2%.

In addition, in the communication system shown in FIG. 1, the downlink scheduling may be performed by the network device, and the network device as the transmitting end is not aware of specific channel conditions of the terminal device. In the embodiments of the present disclosure, Measurement of the channel quality may be performed by the terminal device. Specifically, the terminal device may quantize the channel quality into a sequence of 0-15 (for example, it may be carried by a 4-bit number), and define the sequence as a CQI, and the network device may determine a coding mode according to the reported CQI. In practical applications, the criteria for CQI selection may be that an error rate of transport blocks (i.e. BLER) received by the terminal device does not exceed a certain value (for example, 10%). Specifically, if the BLER is greater than a certain value (for example, 10%), the test fails, otherwise, the test is successful. Therefore, the CQI reported by the terminal device is related not only to signal to interference plus noise ratio (SINR) of the downlink reference signal but also to a sensitivity of the UE receiver. Thus, for those UEs that employ advanced signal processing algorithms (such as the interference cancellation technique), a higher and more accurate channel quality indicator may be reported.

For example, taking the Physical Downlink Shared Channel (PDSCH) as an example, the CQI value used when the BLER of the PDSCH is less than 10% may be understood as that the UE needs to evaluate the downlink feature according to the measurement result (such as SINR) and evaluate the BLER value obtained according to the result, and then report the corresponding CQI value according to the limit of BLER being less than 10%. Different values of CQI determine the difference between the downlink modulation modes and difference between the transport block sizes. The larger the CQI value, the higher the modulation and coding mode used, the greater the efficiency, the larger the corresponding transport block, and the higher the downlink peak throughput. It should be understood that, in the embodiments of the present disclosure, the reporting period of the CQI in the time domain and the CQI granularity in the frequency domain may be configured by the network device. In addition, the way to report the CQI is not specifically limited in the embodiments of the present disclosure. For example, it may be reported periodically and carried by a Physical Uplink Control Channel (PUCCH), and its period is configured by Radio Resource Control (RRC). For another example, it may be reported aperiodically, carried by a PUSCH, transmitted in any Transmission Time Interval (TTI), and is determined by uplink scheduling of the network device. For another example, the CQI may be reported in a full-band, that is, the CQIs in the entire system bandwidth are reported. For another example, the CQI may be reported in a sub-band, that is, the terminal device reports the CQI indexes in multiple sub-bands, and the bandwidth of the sub-band is related to the system bandwidth and is configured by the RRC.

In the embodiments of the present disclosure, the URLLC service may also be introduced in the communication system shown in FIG. 1 to achieve ultra-high reliability (for example, 99.999%) transmission of the service in an extreme latency (for example, 1 ms). In an embodiment, when transmitting a service with lower reliability requirements, the terminal device may be enabled to feedback CQI indexes based on multiple BLERs values, for example, the corresponding CQI indexes may be reported based on the limit of BLER being less than 10%. When the terminal needs to ensure the transmission reliability of the data (for example, the URLLC service), the CQI index may be fedback based on a lower BLER, for example, the corresponding CQI index is reported based on the limit of BLER being less than 1%. In other words, the terminal device may feedback channel quality indicator (CQI) indexes based on one of multiple target block error rate (BLER). Furthermore, a lower modulation and coding scheme (MCS) may be adopted for the corresponding data transmission.

In practical application, the CQI index feedback by the terminal device based on the target BLER, is determined by a CQI table. The CQI table in the embodiments of the present disclosure is exemplarily described below. In this example, the CQI index has a certain correspondence with a modulation mode, a code rate, and a spectrum utilization efficiency. In some embodiments, a CQI table may be a suitable variant of Table 1 below.

TABLE 1

CQI Table

| CQI Index | Modulation Mode | Rate x 1024 | Spectrum utilization efficiency |
|---|---|---|---|
| 0 | | Out of range | |
| 1 | QPSK | 30 | 0.05858 |

TABLE 1-continued

CQI Table

| CQI Index | Modulation Mode | Rate x 1024 | Spectrum utilization efficiency |
|---|---|---|---|
| 2 | QPSK | 55 | 0.1073 |
| 3 | QPSK | 78 | 0.1523 |
| 4 | QPSK | 120 | 0.2344 |
| 5 | QPSK | 193 | 0.3770 |
| 6 | QPSK | 308 | 0.6016 |
| 7 | QPSK | 449 | 0.8770 |
| 8 | QPSK | 602 | 1.1758 |
| 9 | 16QAM | 378 | 1.4766 |
| 10 | 16QAM | 490 | 1.9141 |
| 11 | 16QAM | 616 | 2.4063 |
| 12 | 64QAM | 466 | 2.7305 |
| 13 | 64QAM | 567 | 3.3223 |
| 14 | 64QAM | 666 | 3.9023 |
| 15 | 64QAM | 772 | 4.5234 |
| 16 | 64QAM | 873 | 5.1152 |
| 17 | 64QAM | 948 | 5.5547 |
| 18 | 256QAM | 711 | 5.5547 |
| 19 | 256QAM | 797 | 6.2266 |
| 20 | 256QAM | 885 | 6.9141 |
| 21 | 256QAM | 948 | 7.4063 |
| 22-31 | Reserved | Reserved | Reserved |

In Table 1, the spectrum utilization efficiency may be usually determined by simulation or experiment. For example, information that may be carried in a resource element (RE) is 5.554, and the rest carried in the RE is redundant bits (using 64QAM, and the channel bit or physical bit of each RE is 6), that is, the efficiency is 5.554 (efficiency=5.554). Out of range corresponds to the CQI index 0, which may be understood as that the downlink signal quality of the terminal device is so poor that it cannot meet the target BLER under any modulation mode or coding rate in the CQI table.

Further, in the embodiments of the present disclosure, the terminal device may feedback the CQI based on multiple target BLERs, that is, the terminal device feedbacks the CQI index based on one of multiple target BLERs, so that the terminal device can adapt to different target BLERs for services with different reliability requirements. Furthermore, one CQI table may be configured for each of the multiple target BLERs, or one CQI table may be shared by the multiple target BLERs in other explicit indication manner. For example, a target BLER (for example, a URLLC service) of a service with a high reliability requirement and a target BLER of a service with a lower reliability requirement, may each be configured with one CQI table respectively, or may each be configured to different value ranges in one CQI table shared. However, if the terminal device feedbacks the CQI based on multiple target BLERs, and the CQI feedback of the multiple target BLERs is based on multiple CQI tables, resulting in excessive overhead of CQI, which may reduce the user experience. The implementation of CQI feedback based on multiple target BLERs by the terminal device is exemplarily described below with reference to FIG. 2.

Figure 2:
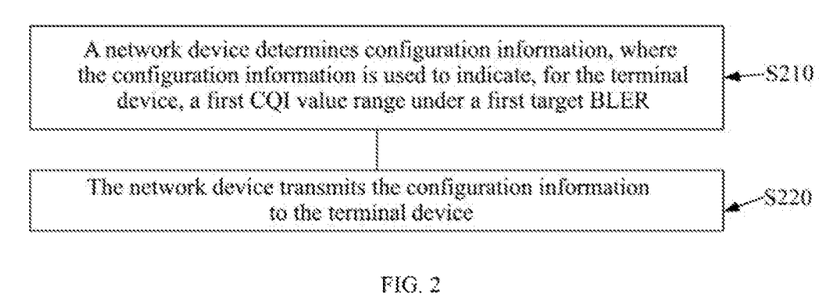
FIG. 2 is a schematic flowchart of a method for transmitting configuration information according to an embodiment of the present disclosure.

FIG. 2 is a schematic flowchart of a method for transmitting configuration information according to an embodiment of the present disclosure. As shown in FIG. 2, the method may include the following steps:

S210, a network device determines configuration information, where the configuration information is configured to indicate, for the terminal device, the first CQI value range under the first target BLER.

S220, the network device transmits the configuration information to the terminal device.

In the embodiments of the present disclosure, the network device indicates the first CQI value range under the first BLER to the terminal device by using the configuration information, which can effectively save the overhead of high-level signaling, compared to by a manner of configuring a CQI table. In addition, since the CQI value range is configurable, firstly, the network device can configure a continuous CQI value range for the terminal device according to continuous changes of a user channel quality, so that the configured CQI value range can greatly conform to changes of the user channel, thereby improving the reliability of the CQI feedback; further, the network device can also adjust the length of the value range according to an application scenario, resulting in reduced number of bits of CQI feedback from the terminal device, thereby avoiding resource waste and further improving the reliability of the CQI feedback. In addition, in embodiments of the present disclosure, different CQI value ranges can be configured for different target BLERs, so that the configured CQI value range matches the user channel environment and the transmission requirement, so as to improve the CQI indicating efficiency and reliability.

The first CQI value range includes some or all of CQI indexes in the CQI table except a first CQI index, where the first CQI index is configured to reflect that the modulation and coding mode required by the terminal device to achieve a first target BLER is not within the range of the CQI table, or the first CQI value range includes some or all of the CQI indexes in the CQI table. In other words, the first CQI index is index 0 in Table 1.

In S210, multiple target BLERs may correspond to different value ranges in a same CQI table that may be a pre-configured, for example, statically configured or semi-statically configured tables. The following takes the method for determining the first CQI value range under the first target BLER as an example.

In an embodiment, the configuration information may include: first indication information, configured to indicate a position in the CQI table at which a start position of the first CQI value range locates. Further, a length of the first CQI value range in the CQI table may be pre-configured. In some embodiments, the length of the first CQI value range in the CQI table may also be dynamically indicated. For example, the configuration information may further include: second indication information, configured to indicate the length of the first CQI value range in the CQI table. It should be understood that in the embodiments of the present disclosure, positions in the CQI table at which starting positions of CQI value ranges under different target BLERs locate may be different, or may be partially the same, or may be completely the same, which is not specifically limited herein. Similarly, lengths of CQI value ranges under different target BLERs in the CQI table are the same, or are different. That is, the lengths of the CQI value ranges under different target BLERs in the CQI table may be different, or may be partially the same, or may be completely the same, which is not specifically limited herein.

Taking that the configuration information includes the first indication information as an example, the terminal device may determine the first CQI value range under the first target BLER (i.e., the CQI table used by the first terminal device) based on a position in the CQI table at which the starting position of the first CQI value range locates indicated by the first indication information and the pre-configured length of the first CQI value range in the CQI table. As an example, with reference to Table 1, the first indication information is configured to indicate that the starting position of the CQI value range under target BLER=10^-1 is the third element of the CQI index column in the CQI table shown in Table 1, the length of the CQI value range thereof in the CQI table is 16, and thus the CQI value range corresponding to the target BLER=10^-1 is from the third element to the eighteenth element. As another example, the first indication information is configured to indicate that the position in the CQI table at which the starting position of the CQI value range under the target BLER=10^-4 locates is the first element of the CQI index column in the CQI table shown in Table 1, the length of the CQI value range thereof in the CQI table is 16, and thus the CQI value range corresponding to the target BLER=10^-4 is from the first element to the sixteenth element. That is to say, one element may be selected from the third element to the eighteenth element for the CQI feedback under target BLER=10^-1 by the terminal device, and one element may be selected from the first element to the sixteenth element for the CQI feedback under target BLER=10^-4 by the terminal device.

Taking that the configuration information includes both the first indication information and the second indication information as an example, the terminal device may determine the first CQI value range under the first target BLER (i.e., the CQI table used by the first terminal device) based on the position in the CQI table at which the starting position of the first CQI value range locates indicated by the first indication information and the length of the first CQI value range in the CQI table indicated by the second indication information. As an example, as shown in Table 1, the first indication information is configured to indicate that the position in the CQI table at which the starting position of the CQI value range under the target BLER=10^-1 locates is the third element of the CQI index column shown in Table 1, the second indication information is configured to indicate that the length of the CQI value range under the target BLER=10^-1 in the CQI table is 16, and then the CQI value range corresponding to the target BLER=10^-1 is from the third element to the eighteenth element. As another example, the first indication information is configured to indicate that the position in the CQI table at which the starting position of the CQI value range under the target BLER=10^-4 locates is the first element of the CQI index column shown in Table 1, the second indication information is configured to indicate that the length of the CQI value range under the target BLER=10^-4 in the CQI table is 8, and then the CQI value range corresponding to the target BLER=10^-4 is from the first element to the eighth element. That is to say, one element may be selected from the third element to the eighteenth element for the CQI feedback under the target BLER=10^-1 by the terminal device, and one element may be selected from the first element to the eighth element for the CQI feedback under the target BLER=10^-4 by the terminal device.

It should be understood that, in the foregoing embodiment, only the cases that the configuration information includes the first indication information or the configuration information includes both the first indication information and the second indication information are taken as examples. In some embodiments, the configuration information may also include only the second indication information, which is not specifically limited in the embodiments of the present disclosure. For example, before configuring the CQI table, the CQI value range corresponding to a specific target BLER is appointed. For example, the first CQI value range corresponding to the first target BLER is from the third element to the eighteenth element in the CQI table.

In addition, in the embodiments of the present disclosure, for the service with high reliability requirements, a lower modulation and coding scheme (MCS) may be adopted for corresponding data transmission. To achieve the above purpose, in the embodiments of the present disclosure, there is also provided a method for indicating an MCS value range for the terminal device. In an implementation, the foregoing configuration information is further configured to indicate, for the terminal device, a first MCS value range corresponding to a first type of multiple types. It should be understood that the multiple types may be distinguished by at least one of a DCI format, a search space and a target BLER. The first MCS value range may include some or all of the MCS indexes in the MCS table.

In an embodiment, the configuration information may include: third indication information, configured to indicate a position in the MCS table at which a starting position of the first MCS value range locates. Further, a length of the first MCS value range in the MCS table is pre-configured. In some embodiments, the length of the first MCS value range in the MCS table may also be dynamically indicated. For example, the configuration information may further include: fourth indication information, configured to indicate a length of the first MCS value range in the MCS table. It should be understood that, in the embodiments of the present disclosure, positions in the MCS table at which start positions of the MCS value ranges under different target BLERs locate may be different, or may be partially the same, or may be completely the same, which is not specifically limited herein. Similarly, lengths of MCS value ranges under different target BLERs in the MCS table are the same, or are different. That is, the lengths of the MCS value ranges under different target BLERs in the MCS table may be different, or may be partially the same, or may even be completely the same, which is not specifically limited herein.

Taking that the configuration information includes the third indication information as an example, the terminal device may determine the first MCS value range under the first target BLER (i.e., the MCS table used by the first terminal device) based on a position in the MCS table at which a starting position of the first MCS value range locates indicated by the third indication information. As an example, with reference to Table 1, for the Type 1 scheduling of the PDSCH, the third indication information is configured to indicate that the starting position of the MCS value range for is the third element of the MCS index column in the MCS table shown in Table 1, the length of the MCS value range thereof in the MCS table is 16, and thus the MCS value range corresponding to the Type 1 scheduling of the PDSCH is from the third element to the eighteenth element. As another example, for the type 2 scheduling of the PDSCH, the third indication information is configured to indicate that the starting position of the MCS value range is the first element of the MCS index column in the MCS table shown in Table 1, the length of the MCS value range thereof in the MCS table is 16, and then the MCS value range corresponding to the type 2 scheduling of the PDSCH is from the first element to the sixteenth element. That is to say, one MCS may be selected from the third element to the eighteenth element to demodulate data by the terminal device in case of the Type 1 scheduling of the PDSCH; and one MCS may be selected from the first element to the sixteenth element to demodulate data by the terminal device in case of the Type 2 scheduling of the PDSCH.

Taking that the configuration information includes both the third indication information and the fourth indication information as an example, the terminal device may determine the first MCS value range (i.e., the first MCS table used by the terminal device) under the first target BLER based on a position in the MCS table at which a starting position of the first MCS value range locates indicated by the third indication information and a length of the first MCS value range in the MCS table indicated by the fourth indication information. As an example, with reference to Table 1, for the Type 1 scheduling of the PDSCH, the third indication information is configured to indicate that the starting position of the MCS value range is the third element of the MCS index column in the MCS table shown in Table 1, the fourth indication information is configured to indicate that the length of the MCS value range in the MCS table is 16, and thus the MCS value range of the Type 1 scheduling of the PDSCH is from the third element to the eighteenth element. As another example, for the Type 2 scheduling of the PDSCH, the third indication information is configured to indicate that the starting position of the MCS value range is the first element of the MCS index column in the MCS table shown in Table 1, the fourth indication information is configured to indicate that the length of the MCS value range in the MCS table is 8, and then the MCS value range of the Type 2 scheduling of the PDSCH is from the first element to the eighth element. That is to say, one MCS may be selected from the third element to the eighteenth element to demodulate data by the terminal device in case of the Type 1 scheduling of the PDSCH; and one MCS may be selected from the first element to the eighth element to demodulate data by the terminal device in case of the Type 2 scheduling of the PDSCH.

It should be understood that, in the foregoing embodiment, cases that the configuration information includes the third configuration information or the configuration information includes both the third indication information and the fourth indication information are taken as examples. In some embodiments, the configuration information may also include only the fourth indication information, which is not specifically limited in the embodiments of the present disclosure. For example, before configuring the MCS table, the MCS value range corresponding to a specific type is appointed. For example, the first MCS value range corresponding to the first type is from the third element to the eighteenth element in the MCS table.

Figure 3:
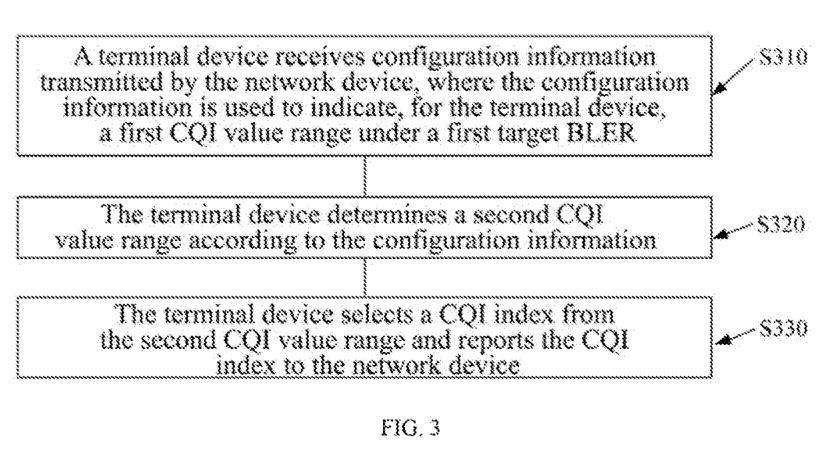
FIG. 3 is a schematic flowchart of a method for receiving configuration information according to an embodiment of the present disclosure.

FIG. 3 is a schematic flowchart of a method for receiving configuration information according to an embodiment of the present disclosure. Specifically, as shown in FIG. 3, the method includes:

S310, a terminal device receives configuration information transmitted by the network device, where the configuration information is configured to indicate, for the terminal device, a first CQI value range under the first target BLER;

S320, the terminal device determines the second CQI value range according to the configuration information; and S330, the terminal device selects a CQI index from the second CQI value range and reports the CQI index to the network device.

Further, the first CQI value range includes some or all of CQI index in the CQI table except the first CQI index, where the first CQI index is configured to reflect that the modulation and coding mode required by the terminal device to achieve the first target BLER is not within the range of the CQI table, or the first CQI value range includes some or all of the CQI indexes in the CQI table; thus, in S320, the terminal device determines a range formed by the first CQI value range and the first CQI index to be the second CQI value range. It should be understood that, in S320, the terminal device may directly determine the first CQI value range as the second CQI value range when the first CQI value range includes some or all of the CQI indexes in the CQI table.

It should be understood that the technical solution of the terminal device side corresponds to that of the network device side, which will not be repeated herein.

Figure 4:
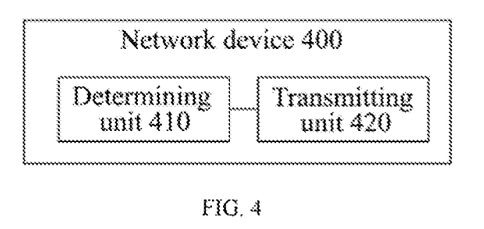
FIG. 4 is a schematic block diagram of a network device according to an embodiment of the present disclosure.

FIG. 4 is a schematic block diagram of a network device according to an embodiment of the present disclosure.

Specifically, as shown in FIG. 4, the network device 400 may include:

a determining unit 410, configured to determine configuration information, where the configuration information is configured to indicate, for the terminal device, a first CQI value range under a first target BLER; and a transmitting unit 420, configured to transmit the configuration information to the terminal device.

In an implementation, the first CQI value range includes some or all of the CQI indexes in the CQI table except the first CQI index, where the first CQI index is configured to reflect that the modulation and coding mode required by the terminal device to achieve the first target BLER is not within the range of the CQI table, or the first CQI value range includes some or all of the CQI indexes in the CQI table.

In an implementation, the configuration information includes: first indication information, where the first indication information is configured to indicate a position in a CQI table at which a starting position of the first CQI value range locates.

In an implementation, a length of the first CQI value range in the CQI table is pre-configured.

In an implementation, the configuration information includes: second indication information, where the second indication information is configured to indicate a length of the first CQI value range in the CQI table.

In an implementation, starting positions of CQI value ranges under different target BLERs in the CQI table are different.

In an implementation, lengths of CQI value ranges under different target BLERs in the CQI table are the same, or are different.

In an implementation, the configuration information is further configured to indicate, for the terminal device, a first MCS value range corresponding to a first type of multiple types.

In an implementation, the multiple types are distinguished by at least one of a downlink control information DCI format, a search space and a target BLER.

In an implementation, the first MCS value range includes some or all of the MCS indexes in the MCS table.

In an implementation, the configuration information includes: third indication information, where the third indication information is configured to indicate a starting position in the MCS table of the first MCS value range.

In an implementation, a length of the first MCS value range in the MCS table is pre-configured.

In an implementation, the configuration information further includes: fourth indication information, where the fourth indication information is configured to indicate a length of the first MCS value range in the MCS table.

In an implementation, positions in the MCS table at which starting positions of MCS value ranges corresponding to different types locate are different.

In an implementation, lengths of MCS value ranges corresponding to different types in the MCS table are the same, or are different.

Figure 5:
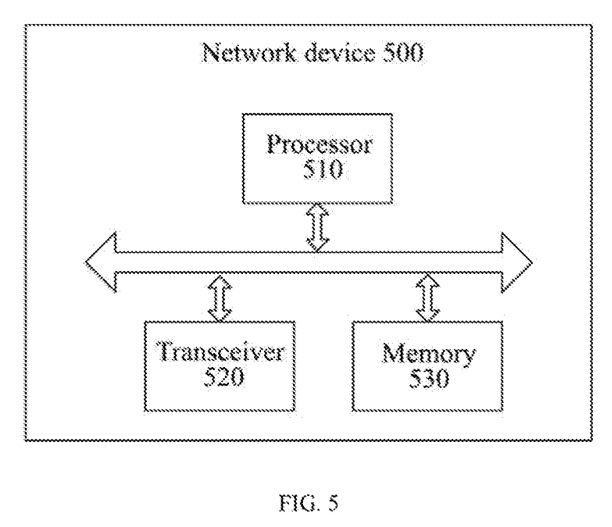
FIG. 5 is a schematic block diagram of another network device according to an embodiment of the present disclosure.

In the embodiments of the present disclosure, the determining unit 410 may be implemented by a processor, and the transmitting unit 420 may be implemented by a transceiver. As shown in FIG. 5, a network device 500 may include a processor 510, a transceiver 520 and a memory 530. The network device 500 may implement various processes implemented by the network device in the foregoing method embodiment in FIG. 2 and FIG. 3, which will not be repeated herein gain. That is, the method embodiment in the embodiments of the present disclosure may be implemented by the processor and the transceiver.

Figure 6:
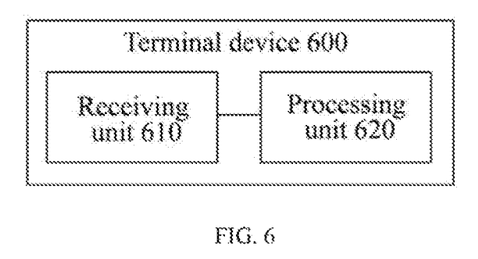
FIG. 6 is a schematic block diagram of a terminal device according to an embodiment of the present disclosure.

FIG. 6 is a schematic block diagram of a terminal device according to an embodiment of the present disclosure.

Specifically, as shown in FIG. 6, the terminal device 600 may include:

a receiving unit 610, configured to receive configuration information transmitted by a network device, where the configuration information is configured to indicate, for the terminal device, a first CQI value range under a first target BLER; and a processing unit 620, configured to determine the second CQI value range according to the configuration information, and select a CQI index from the second CQI value range and report the CQI index to the network device.

In an implementation, the first CQI value range includes some or all of the CQI indexes in the CQI table except the first CQI index, where the first CQI index is configured to reflect the modulation and coding mode required by the terminal device to achieve the first target BLER is not within the range of the CQI table, or the first CQI value range includes some or all of the CQI indexes in the CQI table; where the processing unit 620 is specifically configured to:

determine a range formed by the first CQI value range and the first CQI index to be the value range of the second CQI.

In an implementation, the configuration information includes: first indication information, where the first indication information is configured to indicate a position in the CQI table at which a start position of the first CQI value range locates.

In an implementation, the length of the first CQI value range in the CQI table is pre-configured.

In an implementation, the configuration information includes: second indication information, where the second indication information is configured to indicate a length of the first CQI value range in the CQI table.

In an implementation, positions in the CQI table at which starting positions of CQI value ranges under different target BLERs locate are different.

In an implementation, lengths of CQI value ranges under different target BLERs in the CQI table are the same, or are different.

In an implementation, the configuration information is further configured to indicate, for the terminal device, a first MCS value range corresponding to a first type of multiple types.

In an implementation, the multiple types are distinguished by at least one of a DCI format, a search space and a target BLER.

In an implementation, the first MCS value range includes some or all MCS indexes in the MCS table.

In an implementation, the configuration information includes: third indication information, where the third indication information is configured to indicate a position in the MCS table at which a starting position of the first MCS value range locates.

In an implementation, a length of the first MCS value range in the MCS table is pre-configured.

In an implementation, the configuration information further includes: fourth indication information, where the fourth indication information is configured to indicate a length of the first MCS value range in the MCS table.

In an implementation, positions in the MCS table at which starting positions of MCS value ranges corresponding to different types locate are different.

In an implementation, lengths of MCS value ranges corresponding to different types in the MCS table are the same, or are different.

Figure 7:
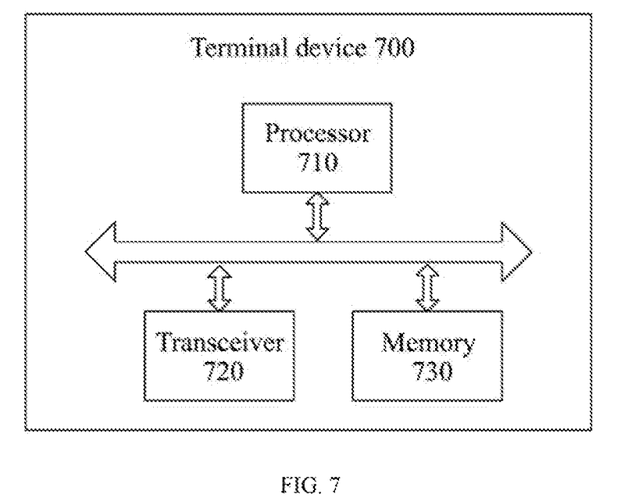
FIG. 7 is a schematic block diagram of another terminal device according to an embodiment of the present disclosure.

In the embodiments of the present disclosure, the receiving unit 610 can be implemented by a transceiver, and the processing unit 620 can be implemented by a processor. As shown in FIG. 7, the terminal device 700 may include a processor 710, a transceiver 720 and a memory 730. The terminal device 700 may implement the various processes implemented by the terminal device in the foregoing method embodiment of FIG. 2 and FIG. 3, which will not be repeated herein. That is, the method embodiment in the embodiments of the present disclosure may be implemented by the processor and the transceiver.

In the implementation process, each of the steps of the foregoing method embodiments in the embodiments of the present disclosure may be completed by an integrated logic circuit of hardware in the processor or by instructions in a form of software. In particular, the steps of the methods disclosed in the embodiments of the present disclosure may be directly completed by the hardware decoding processor, or may be performed by a combination of hardware and software modules in the hardware decoding processor. The software module may be located in a conventional storage medium such as a random access memory, a flash memory, a read only memory, a programmable read only memory or an electrically erasable programmable memory, and a register. The storage medium is located in a memory, and a processor reads the information in the memory and completes the steps of the foregoing methods in combination with its hardware.

It should be understood that the processor involved in the embodiments of the present disclosure may be an integrated circuit chip having a signal processing capability to implement or execute the disclosed methods, steps and logic blocks in the embodiments of the present disclosure. For example, the above processor may be a general purpose processor, a digital signal processor (DSP), an application specific integrated circuit (ASIC), a field programmable gate array (FPGA), or other programmable logic devices, transistor logic devices, discrete hardware components, etc. Further, the general purpose processor may be a microprocessor or it may be any conventional processor or the like.

In addition, the memory involved in the embodiments of the present disclosure may be a volatile memory or a non-volatile memory, or may include both the volatile memory and the non-volatile memory. The non-volatile memory may be a read-only memory (ROM), a programmable read only memory (ROMM), an erasable programmable read only memory (EPROM), an electrical erasable programmable EPROM (EEPROM) or a flash memory. The volatile memory may be a random access memory (RAM) serving as an external cache. It should be understood that the foregoing memory is exemplary but not limited. For example, the memory in the embodiments of the present disclosure may also be a static random access memory (SRAM), a dynamic random access memory (DRAM), or a synchronous dynamic random access memory (SDRAM), a double data rate synchronous dynamic random access memory (DDR SDRAM), an enhanced synchronous dynamic random access memory (ESDRAM), a synch link DRAM (SLDRAM), a direct rambus RAM (DR RAM), etc. That is, the memory in the embodiments of the present disclosure is intended to include, but is not limited to, these and any other suitable types of memory.

Finally, it should be noted that the terminology in the embodiments of the present disclosure and the attached claims are used for the purpose of illustrating specific embodiments only and are not to be taken in a limiting sense.

For example, "a", "the", "the above" and "this" in the singular form are also intended to include the plural form thereof, unless the context clearly indicates otherwise.

Those of ordinary skill in the art will appreciate that units and algorithm steps of each example described with reference to the embodiments disclosed herein may be implemented in electronic hardware or a combination of computer software and electronic hardware. Whether these functions are executed in hardware or software depends on the specific application and design constraints of the technical solution. A person skilled in the art may use different methods for implementing the described functions for each specific application, but such implementation should not be considered to be beyond the range of the present application.

A person skilled in the art may clearly understand that for convenience and brevity of the description, the specific working process of the system, the apparatus and the unit described above may refer to corresponding processes in the foregoing method embodiments, and will not be repeated herein.

In the several embodiments provided by the present application, it should be understood that the disclosed systems, apparatuses, and methods may be implemented in other ways. For example, the apparatus embodiments described above are merely illustrative. For example, the division of the unit is only a logical function division, and there may be other division ways in actual implementation, for example, multiple units or components may be combined or be integrated into another system, or some features may be ignored or not executed. In addition, mutual coupling or direct coupling or communication connection shown or discussed herein may be an indirect coupling or communication connection through some interfaces, apparatuses or units, and may be in the form of electrical, mechanical or otherwise.

The units described as separate components may be or may not be physically separated, and the components displayed as units may be or may not be physical units, that is, they may be located in one place, or may be distributed onto multiple network units. Some or all of the units may be selected according to actual needs for the purpose of the solution of the present embodiment.

In addition, each functional unit in the embodiments of the present application may be integrated into one monitoring unit, or each unit may physically exist, or two or more units may be integrated into one unit.

The functions may be stored in a computer readable storage medium if they are implemented in the form of a software functional unit, and sold or used as a standalone product. Based on such understanding, the technical solution of the present application, in essence, or the part contributing to the existing technology or the part of the technical solution may be embodied in the form of a software product, and the computer software product is stored in a storage medium and includes instructions for enabling a computer device (which may be a personal computer, a server, or a network device, etc.) to perform all or part of the steps described in methods in the embodiments of the present application. The above storage medium includes various media that may store program code, such as a U disk, a mobile hard disk, a read-only memory (ROM), a random access memory (RAM), a magnetic disk, or an optical disk.

The above is only a specific implementation form of the present application, the scope of protection of the present application is not limited thereto, and changes or substitutions that may easily be derived by those skilled in the art within the technical scope disclosed in the present application should be covered by the scope of protection of the present application. Therefore, the scope of protection of the present application should be subject to the scope of protection of the claims.

What is claimed is:

1. A method for receiving configuration information, comprising:

receiving, by a terminal device, configuration information transmitted by a network device, wherein the configuration information is configured to indicate, for the terminal device, a first channel quality indicator (CQI) value range under a first target block error rate (BLER), wherein different CQI value ranges are configured for different target BLERs, wherein a CQI value range that is configured for each of the different target BLERs is different from a CQI value range that is configured for any other target BLER of the different target BLERs, wherein the configuration information is further configured to indicate, for the terminal device, a first modulation and coding scheme (MCS) value range corresponding to a first type of multiple types; and selecting, by the terminal device, a CQI index from the first CQI value range and reporting the CQI index to the network device, wherein the first CQI value range comprises some or all of the CQI indexes in a CQI table;

wherein, the configuration information comprises first indication information, wherein the first indication information is configured to indicate a position in the CQI table at which a start position of the first CQI value range is located, and the method further comprises:

determining, by the terminal device, the first CQI value range under the first target BLER based on the position in the CQI table at which the starting position of the first CQI value range is located indicated by the first indication information and a pre-configured length of the first CQI value range in the CQI table; or, the configuration information comprises the first indication information and second indication information, wherein the second indication information is configured to indicate a length of the first CQI value range in the CQI table, and the method further comprises:

determining, by the terminal device, the first CQI value range under the first target BLER based on the position in the CQI table at which the starting position of the first CQI value range is located indicated by the first indication information and the length of the first CQI value range in the CQI table indicated by the second indication information.

2. The method of claim 1, wherein a length of the first CQI value range in the CQI table is pre-configured; and lengths of CQI value ranges under the different target BLERs in the CQI table are the same.

3. The method of claim 1, wherein the CQI table comprises a plurality of CQI indexes, wherein each CQI index corresponds to a value of code rate×1024, and the minimum value of code rate×1024 in the table is 30.

4. The method of claim 1, wherein the multiple types are distinguished by at least one of a downlink control information (DCI) format, a search space and a target BLER.

5. The method of claim 1, wherein the configuration information further comprises third indication information, wherein the third indication information is configured to indicate a position in a MCS table at which a starting position of the first MCS value range is located, and the method further comprises:
- determining, by the terminal device, the first MCS value range under the first target BLER based on the position in the MCS table at which the starting position of the first MCS value range is located indicated by the third indication information and a pre-configured length of the first MCS value range in the MCS table; or,
- the configuration information comprises the third indication information and fourth indication information, wherein the fourth indication information is configured to indicate a length of the first MCS value range in a MCS table, and the method further comprises:
- determining, by the terminal device, the first MCS value range under the first target BLER based on the position in the MCS table at which the starting position of the first MCS value range is located indicated by the third indication information and the length of the first MCS value range in the MCS table indicated by the fourth indication information.

6. A terminal device, comprising:
- a receiver, configured to receive configuration information transmitted by a network device, wherein the configuration information is configured to indicate, for the terminal device, a first channel quality indicator (CQI) value range under a first target block error rate (BLER), wherein different CQI value ranges are configured for different target BLERs, wherein a CQI value range that is configured for each of the different target BLERs is different from a CQI value range that is configured for any other target BLER of the different target BLERs, wherein the configuration information is further configured to indicate, for the terminal device, a first modulation and coding scheme (MCS) value range corresponding to a first type of multiple types; and
- a processor, configured to select a CQI index from the first CQI value range and report the CQI index to the network device, wherein the first CQI value range comprises some or all of the CQI indexes in a CQI table; wherein,
- the configuration information comprises first indication information, wherein the first indication information is configured to indicate a position in the CQI table at which a start position of the first CQI value range is located, and the processor is further configured to:
- determine the first CQI value range under the first target BLER based on the position in the CQI table at which the starting position of the first CQI value range is located indicated by the first indication information and a pre-configured length of the first CQI value range in the CQI table; or,
- the configuration information comprises the first indication information and second indication information, wherein the second indication information is configured to indicate a length of the first CQI value range in the CQI table, and the processor is further configured to:
- determine the first CQI value range under the first target BLER based on the position in the CQI table at which the starting position of the first CQI value range is located indicated by the first indication information and the length of the first CQI value range in the CQI table indicated by the second indication information.

7. The terminal device of claim 6, wherein the first MCS value range comprises some or all of MCS indexes in an MCS table.

8. The terminal device of claim 6, wherein a length of the first MCS value range in an MCS table is pre-configured.

9. The terminal device of claim 6, wherein the configuration information further comprises third indication information, wherein the third indication information is configured to indicate a position in an MCS table at which a starting position of the first MCS value range is located, and the processor is further configured to:
- determine the first MCS value range under the first target BLER based on the position in the MCS table at which the starting position of the first MCS value range is located indicated by the third indication information and a pre-configured length of the first MCS value range in the MCS table; or,
- the configuration information further comprises the third indication information and fourth indication information, wherein the fourth indication information is configured to indicate a length of the first MCS value range in an MCS table, and the processor is further configured to:
- determine the first MCS value range under the first target BLER based on the position in the MCS table at which the starting position of the first MCS value range is located indicated by the third indication information and the length of the first MCS value range in the MCS table indicated by the fourth indication information.

10. A method for transmitting configuration information, comprising:
- transmitting, by a network device, configuration information, wherein the configuration information is configured to indicate, for a terminal device, a first channel quality indicator (CQI) value range under a first target block error rate (BLER), wherein different CQI value ranges are configured for different target BLERs, wherein a CQI value range that is configured for each of the different target BLERs is different from a CQI value range that is configured for any other target BLER of the different target BLERs, wherein the configuration information is further configured to indicate, for the terminal device, a first modulation and coding scheme (MCS) value range corresponding to a first type of multiple types; and
- receiving, by the network device, a CQI index reported by the terminal device, wherein the CQI index is selected from the first CQI value range by the terminal device, and wherein the first CQI value range comprises some or all of the CQI indexes in a CQI table; wherein,
- the configuration information comprises first indication information, the first indication information is configured to indicate a position in the CQI table at which a start position of the first CQI value range is located; or,
- the configuration information comprises the first indication information and second indication information, wherein the second indication information is configured to indicate a length of the first CQI value range in the CQI table.

11. The method of claim 10, wherein a length of the first CQI value range in the CQI table is pre-configured; and positions in the CQI table at which starting positions of CQI value ranges under different target BLERs are located are different.

12. The method of claim 10, wherein lengths of CQI value ranges under different target BLERs in the CQI table are the same.

13. The method of claim 10, wherein the first MCS value range comprises some or all of MCS indexes in an MCS table.

14. The method of claim 10, wherein the configuration information further comprises third indication information, wherein the third indication information is configured to indicate a position in an MCS table at which a starting position of the first MCS value range is located; or, the configuration information further comprises the third indication information and fourth indication information, wherein the fourth indication information is configured to indicate a length of the first MCS value range in an MCS table.

15. The method of claim 10, wherein a length of the first MCS value range in an MCS table is pre-configured.

16. The method of claim 10, wherein lengths of MCS value ranges corresponding to different types in an MCS table are the same.

17. The method of claim 10, wherein the multiple types are distinguished by at least one of a downlink control information (DCI) format, a search space and a target BLER.

18. A network device, comprising:
a transceiver, configured to transmit configuration information, wherein the configuration information is configured to indicate, for a terminal device, a first channel quality indicator (CQI) value range under a first target block error rate (BLER), wherein different CQI value ranges are configured for different target BLERs, wherein a CQI value range that is configured for each of the different target BLERs is different from a CQI value range that is configured for any other target BLER of the different target BLERs, wherein the configuration information is further configured to indicate, for the terminal device, a first modulation and coding scheme (MCS) value range corresponding to a first type of multiple types; and receive a CQI index reported by the terminal device, wherein the CQI index is selected from the first CQI value range by the terminal device, and wherein the first CQI value range comprises some or all of the CQI indexes in a CQI table;

wherein,
the configuration information comprises first indication information, wherein the first indication information is configured to indicate a position in the CQI table at which a start position of the first CQI value range is located; or, the configuration information comprises the first indication information and second indication information, wherein the second indication information is configured to indicate a length of the first CQI value range in the CQI table.

19. The method of claim 18, wherein the CQI table comprises a plurality of CQI indexes, wherein each CQI index corresponds to a value of code rate×1024, and the minimum value of code rate×1024 in the table is 30.

20. The method of claim 18, wherein the configuration information further comprises third indication information, wherein the third indication information is configured to indicate a position in an MCS table at which a starting position of the first MCS value range is located; or, the configuration information further comprises the third indication information and fourth indication information, wherein the fourth indication information is configured to indicate a length of the first MCS value range in an MCS table.

* * * * *